United States Patent
Grote

[15] 3,681,899
[45] Aug. 8, 1972

[54] SEPARABLE FILTER HOUSING AND CARTRIDGE FOR A FLUID FLOW LINE

[72] Inventor: George A. Grote, Glen Rock, Pa.

[73] Assignee: National Bank and Trust Company of Central Pennsylvania, Administrator, d.b.n.c.t.a. of Willard C. Beach deceased and Administrator c.t.a. of the Estate of Mary B. Beach, Hanover, Pa.

[22] Filed: July 9, 1970

[21] Appl. No.: 53,475

[52] U.S. Cl. ..................55/503, 55/475, 55/509, 55/515, 55/518
[51] Int. Cl. ..............................B01d 39/08
[58] Field of Search........55/515, 578, 480, 475, 522, 55/503, 509

[56] References Cited

UNITED STATES PATENTS

| | | | |
|---|---|---|---|
| 2,079,807 | 5/1937 | Kehl | 55/522 X |
| 3,291,126 | 12/1966 | Messick | 128/142.5 |
| 3,483,677 | 12/1969 | Pinto | 55/475 |
| 3,555,787 | 1/1971 | Lustig | 55/179 |
| 3,388,536 | 6/1968 | Nash | 55/492 |

*Primary Examiner*—Arthur D. Kellogg
*Attorney*—C. Hercus Just

[57] ABSTRACT

A filter unit for use in filtering fluids and especially gases including compressed air to remove contaminants therefrom and comprising a pair of similar transparent cup-shaped housing members defining a cylindrical cavity which receives a filter cartridge filled with pulverent filter material enclosed in a sheath formed from porous textile material.

6 Claims, 9 Drawing Figures

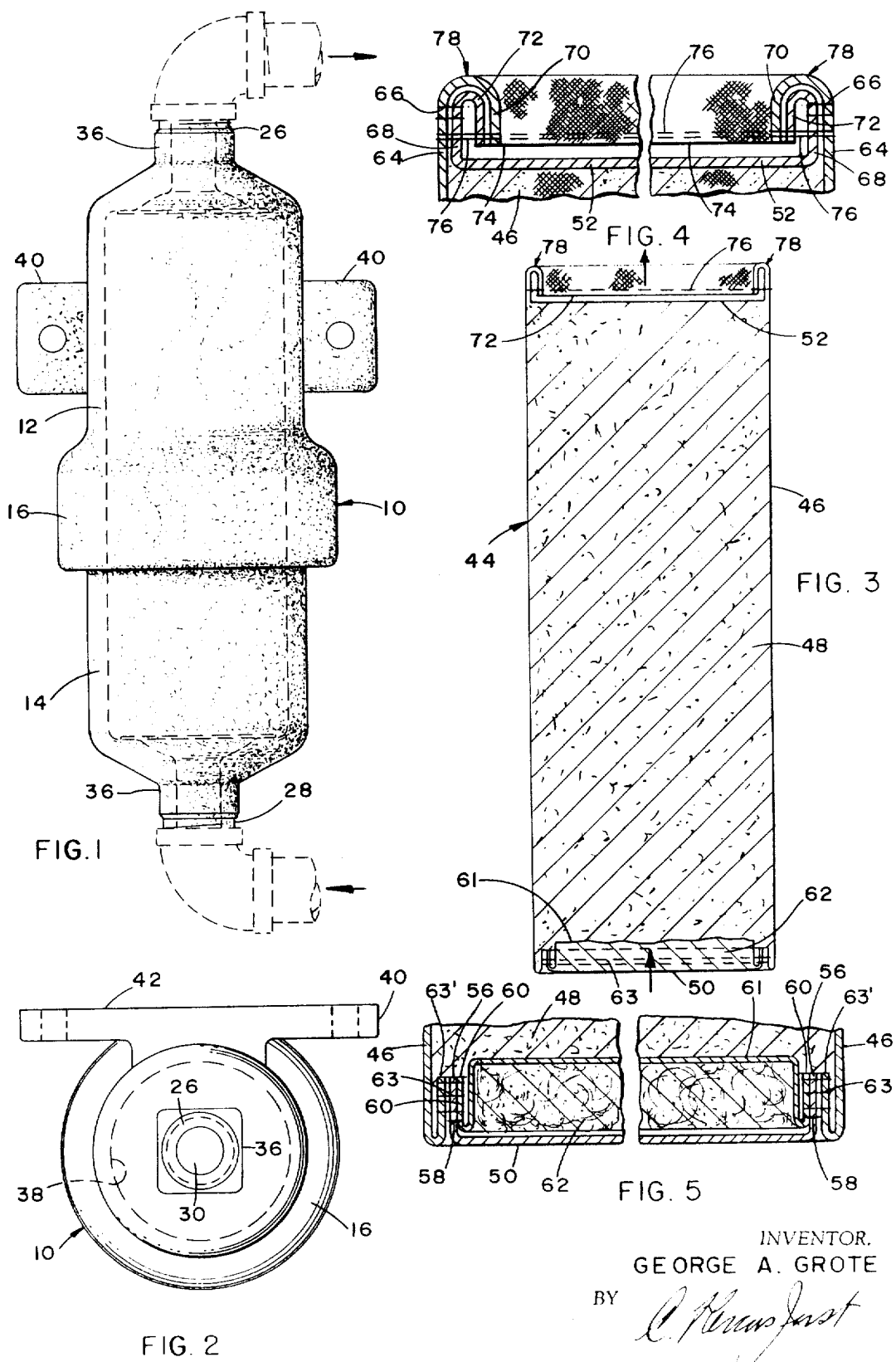

PATENTED AUG 8 1972 3,681,899
SHEET 2 OF 2
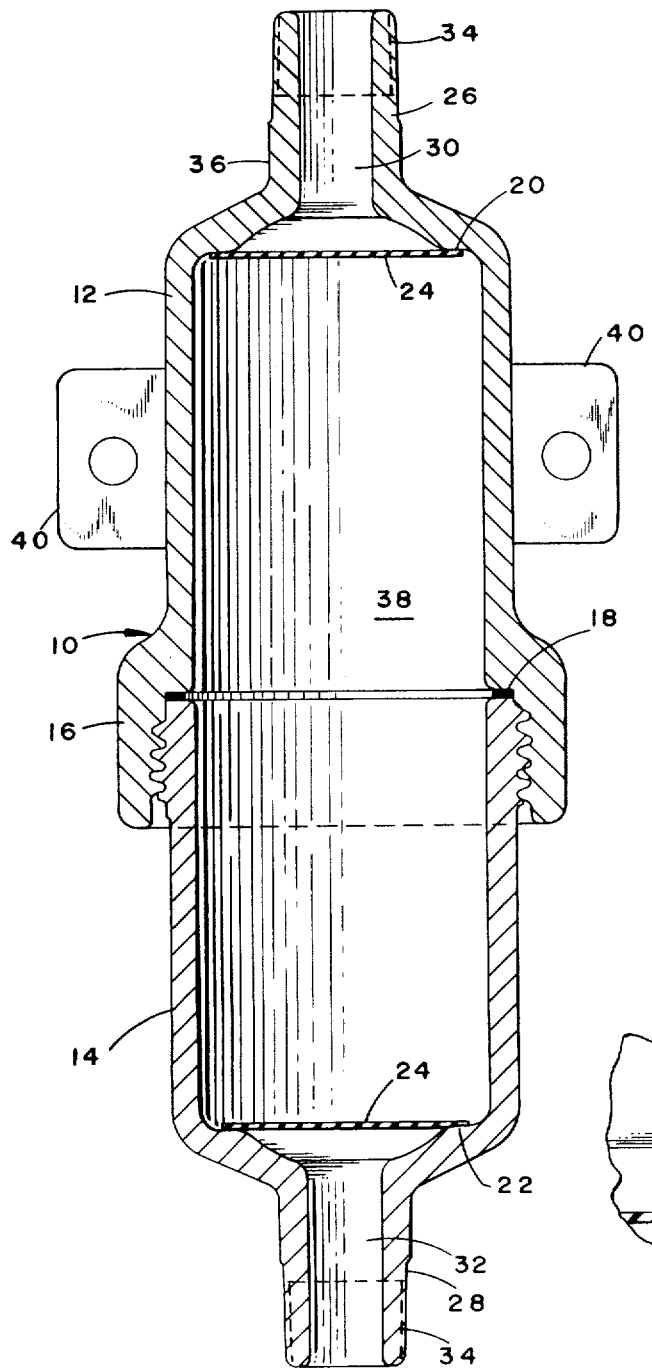
FIG. 6
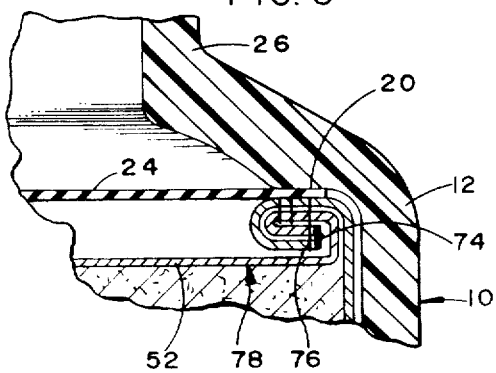
FIG. 7
FIG. 8
FIG. 9
INVENTOR.
GEORGE A. GROTE
BY
*O. Herem Just*
ATTORNEY

SEPARABLE FILTER HOUSING AND CARTRIDGE FOR A FLUID FLOW LINE

CROSS-REFERENCE TO RELATED APPLICATION

The present invention comprises a filter unit embodying certain of the basic principles of the invention comprising the subject matter of patent application Ser. No. 37,125, filed May 14, 1970.

BACKGROUND OF THE INVENTION

Many types of filter units have been devised heretofore for purposes of filtering various types of fluids, such as gases, including compressed air, and in which various filter materials comprising steel wool, rock or slag wool, cotton masses, and the like, are employed as filtering means. Various types of metallic housings have been used to contain the filtering media. Inasmuch as various gases which require filtering are corrosive to certain types of metal and also certain presently used types of filtering media, such previously devised filter units are not satisfactory, especially when filtering corrosive types of gases.

Particularly from an efficiency standpoint, very little attention has been given heretofore to matters of providing filtering media which is contained in a housing in such manner that by-passing of the filtering media by at least a certain amount of the gases can not occur, due particularly to the structure of the housing and the manner in which the filtering media is contained therein.

Typical examples of filtering media devised heretofore are illustrated in U.S. Pat. No. 2,400,719, Stackhouse, dated May 21, 1946 and U.S. Pat. No. 2,789,654, to Zurit, dated Apr. 23, 1957. The Stackhouse structure utilizes compressed rock wool disposed between a pair of screens contained in a brass chamber which is closed at one end by a brass plug. Brass is readily attacked by certain corrosive gases. Further, it is difficult to inspect, at least visually, the condition of the filter media within a metallic enclosure, particularly in the absence of any transparent panels or other means by which such observation may be made.

The Zurit structure shows a filter housing containing a cartridge containing activated carbon enclosed in a polyethylene tube for purposes of filtering air being delivered to beer kegs. No special sealing means are referred to in the disclosure which would prevent the by-passing of the air or at least portions of it between opposite ends of the housing so as to escape filtering. While no specific description is set forth in the specification of said patent, it would appear that the housing and the elements directly connected thereto are formed from metal and thus preclude visual inspection of the condition of the cartridge within the housing.

SUMMARY OF THE INVENTION

The present invention comprises a filter unit especially adapted for filtering, in particular, gaseous material, including air, and comprises a housing formed from a pair of similar cup-shaped members each formed from synthetic resin material and connected at one end of each of the members by complementary internal and external threads, the members defining a cylindrical cavity of precise configurations and dimensions and the opposite ends of the housing members being constricted to form seats against which perforated discs are disposed to engage the opposite ends of a cylindrical filter cartridge comprising a flexible sheath formed from textile material and including end discs which are connected by stitching to the opposite ends of a seamless cylindrical sleeve, said cartridge being filled with pulverent filter material and the length and diameter of the cartridge respectively being slightly greater than the distance between the perforated discs within the housing and the diameter of the cavity therein, whereby pressure is exerted upon the pulverent material within the cartridge when positioned operatively within the cavity of the housing so as to force the cylindrical sleeve of the cartridge into continuous circumferential contact with the surface of the cavity within the housing and thereby prevent by-passing of any gases between said cartridge and cavity walls.

Another object of the invention is to form the cup-shaped housing members, by molding, from transparent synthetic resin material so as to provide ready visual inspection of the condition of the filter cartridge within the housing and also provide a housing which is not susceptible to chemical reaction by most gases and especially corrosive type gases to be filtered by said unit.

A further object of the invention is to provide a filter cartridge in which the sheath which encloses the pulverent filter material preferably is formed from thermoplastic synthetic resin filaments and a seamless tube thereof forms the sidewalls of the cartridge and is connected to end discs of the same material by stitches forming seams which are disposed in various ways to prevent sifting of the pulverent filter material from the ends of the cartridge incident to fluids, and especially gases, passing therethrough.

Details of the foregoing objects and of the invention, as well as other objects thereof are set forth in the following specification and illustrated in the accompanying drawings comprising a part thereof.

DESCRIPTION OF THE DRAWINGS

FIG. 1 is a side elevation of a filter unit embodying the principles of the present invention.

FIG. 2 is a top plan view of the filter unit shown in FIG. 1.

FIG. 3 is a longitudinal sectional view of an exemplary cartridge adapted to be enclosed within the housing of the unit shown in FIGS. 1 and 2.

FIG. 4 is a fragmentary enlarged transverse sectional view of the upper and discharge end portion of the cartridge shown in FIG. 3, the same being broken intermediately of the opposite sides thereof to foreshorten the view.

FIG. 5 is a view similar to FIG. 4 but illustrating the lower, inlet end of the cartridge shown in FIG. 3.

FIG. 6 is a longitudinal sectional view of the housing of the unit illustrated in FIGS. 1 and 2 to show details thereof.

FIG. 7 is a plan view of the perforated discs respectively disposed in opposite ends of the housing of the filter unit shown in FIG. 6.

FIG. 8 is a plan view of a gasket inserted between the two elements of the housing of the filter unit shown in FIG. 6.

FIG. 9 is a fragmentary longitudinal sectional view, on a larger scale than in the preceding figures, and illustrating the manner in which the seamed discharge end of the cartridge illustrated in FIG. 4 is disposed when mounted within the filter housing.

DESCRIPTION OF THE PREFERRED EMBODIMENTS

The present invention primarily comprises an improvement over applicant's prior application, Ser. No. 37,125, referred to above, to the extent that the housing of the unit comprising the subject matter of said previous application is not readily adaptable to being manufactured in small sizes. Further, particularly since the housing thereof is formed from cast metal members which are connected to the opposite ends of a transparent cylindrical rigid tube, it is necessary to plate said castings with suitable metals to render the same reasonably non-reactive to certain corrosive types of gases intended to be filtered by the unit.

In general, while the cost of said housing member is warranted in larger sizes of capacities of filter units, when adapted to smaller sizes, the cost of such production is not competitive with other filters manufactured by different producers. Accordingly, the principal purpose of the present invention is to provide a housing which preferably is cast from synthetic resins and particularly those which, when manufactured into a housing for a filter unit render the same reasonably non-reactive to most types of gases intended to be filtered thereby. In addition, the cost of production is minimal without sacrificing structural advantages, whereby a filter unit embodying the principles of the present invention may be manufactured at a cost which is highly competitive with filters of other producers and such housings may be in relatively small sizes as well as larger ones.

Referring to FIGS. 1 and 6, the housing 10 comprises a pair of similar cup-shaped housing members 12 and 14 which preferably are formed by molding. The preferred materials are suitable synthetic resins which produce rigid molded members capable of retaining precise shape and dimensions. One such resin that is especially adapted for this is a polycarbonate such as a condensate product of bisphenol A and phosgene, one commercial brand of which is manufactured by the General Electric Company, identified as No. 14-111, and sold under the trade name LEXAN. Other resins having similar physical characteristics may be used, whereby the specifically identified resin is primarily indicated for purposes of illustration rather than restriction.

The member 12 is provided on one end with an enlargement 16 having internal threads which are complementary to external threads formed on one end of housing member 14 as clearly shown in FIG. 6. The terminal end of said externally threaded end of member 14 abuts a gasket 18, of relatively compressible material such as neoprene. The thickness of the gasket is adequate to effect an air-tight seal between the threaded ends of the members 12 and 14 when tightly connected together.

The ends of the members 12 and 14 which are opposite the threadably connected ends are constricted respectively to form seats 20 and 22 within planes which are transverse to the longitudinal axis of the housing 10 and against which perforated discs 24 abut. Said discs preferably are formed from stainless steel screening of suitable mesh and relatively rigid for purposes to be described. A plan view of an exemplary disc 24 is shown in FIG. 7 and the position of the same relative to seats 20 and 22 are shown in FIG. 6.

The constricted ends 26 and 28 respectively of members 12 and 14 are provided with axial passages 30 and 32 of materially smaller diameters than the interior of the members 12 and 14. Said constricted ends 26 and 28 are provided with means to connect the same respectively to conduits by which fluids, including gases and especially air, are delivered to and withdrawn from the housing 10 in the manner indicated by the directional arrows in FIG. 1. In the specific illustration shown in FIGS. 1, 2 and 6, said connecting means comprise external pipe threads 34 but other forms of connecting means may be employed if desired. Further, adjacent the threads 34, the constricted ends 26 and 28 also preferably are formed exteriorly to provide a suitable geometric configuration in cross-section, such as the square 36 shown in FIG. 2. Other alternative configurations may be used.

The inner walls of the housing members 12 and 14 preferably are cylindrical and of identical uniform diameters, whereby the combined interior surfaces of said members define an interior cylindrical cavity 38 which is of a precise uniform diameter throughout its length which is defined by the distance between the perforated discs 24. By way of illustration of the adaptability of the design of the housing 10 for use in filters of relatively small size, the illustration in FIG. 6 is substantially full scale for one exemplary size of filter. The interior cavity 38 is approximately two inches in diameter and six inches in length. If desired, the diameter and length may be made smaller or larger, as desired.

One of the members, such as member 12, is provided with mounting means 40 which, as shown in FIG. 2 in particular, is disposed slightly laterally to enlargement 16 of member 12 at its outer surface 42, so as readily to adapt the same for attachment to a supporting surface, such as a wall or other suitable surface. Especially in view of the fact that the member 12 is provided with the enlargement 16 and the outer surface 42 of the supporting means 40 is laterally offset from the periphery of the enlargement 16, the member 14 easily can be unscrewed from member 12 while the latter remains mounted in operative position for purposes of removing a filter cartridge from or installing the same within the cavity 38.

The members 12 and 14 preferably are molded from synthetic resin which is transparent, whereby the condition of the filter cartridge within the cavity 38 readily may be visually inspected. Preferably, as is described in detail hereinafter, the cartridge is of such type that, for example, the color of the same progressively changes as it is subjected to continuous filtering operations so that when the color of the cartridge changes for its full length, such change in color serves as an indication that the cartridge should be replaced. Such phenomenon is described primarily for purposes of illustration rather than restriction, however.

An exemplary filter cartridge 44 of the type preferably intended for use within the cavity 38 is illustrated in longitudinal sectional view in FIG. 3. Various details thereof are also shown in FIGS. 4, 5 and 9. The filter cartridge 44 comprises a completely enclosing sheath which includes a seamless cylindrical sleeve 46 formed from textile fabric woven or otherwise prepared preferably from thermoplastic synthetic resin filaments, such as a suitable polyamide, one form of which is sold under the trademark NYLON. Such fabric is relatively inert to air and most forms of gases and particularly corrosive gases. Other kinds and types of thermoplastic synthetic resin fabrics which are similarly non-reactive to air and most forms of gases may be used in lieu of NYLON, if desired. The mesh of the fabric from which the sleeve 46 is woven is relatively fine, so as to minimize sifting of the pulverent filter material 48, suitable types of which comprise diatomaceous earth or fuller's earth, for example.

Opposite ends of a suitable length of the seamless cylindrical sleeve 46 are connected to and closed by discs 50 and 52 which preferably are formed from the same material as the sleeve 46. In the illustration shown in FIG. 5, the disc 50 comprises one end of the cartridge 44 which is considered to be the inlet end, as indicated by the arrow 54. The peripheral portion 56 of the disc 50, as shown in FIG. 5, is connected by at least one row of stitches 58 to the peripheral edge portion 60 of another disc 62. Enclosed between the discs is a cotton bat 62 of limited thickness which serves somewhat as an auxiliary filter member adapted especially to entrap water vapor which may be in gases being filtered.

The discs 50 and 61 and the bat 62 sandwiched therebetween somewhat resembles a small pillow. When formed, the peripheral edge portions of the connected discs 50 and 61 are secured, preferably by several rows of stitches 63 to the terminal end portion 63' of sleeve 46, as shown in FIG. 5. After forming the seam comprising the connected peripheral portions 56 of disc 50 and 60 of disc 61, and end portion 63' of sleeve 46 by means of the stitches 63, the partially formed sheath is turned inside out so as to dispose the seam inwardly as shown in FIGS. 3 and 5. The opposite open end of the sheath then is filled with the pulverent filter material 48. Said other, open end of the sheath then is closed by disc 52 in the following manner.

The end portion 64 of the sleeve 46 is secured preferably by several rows of stitches 66 to the peripheral portion 68 of disc 52 as also shown in FIG. 4. This forms a seam which initially extends axially outward from the cartridge 44. The terminal end portion 70 and the outermost portion 72 of the periphery of disc 52 preferably are fused at 74 and those portions thereof which extend beyond the stitching 66 in said seam are then turned inwardly adjacent the outermost row of stitches 66 and said inturned end portion is secured fixedly in said position by an additional row of stitches 76 which extend through all four plies of the fabric as shown in FIG. 4.

In the illustrations shown particularly in FIGS. 3, 4 and 5, a small space has been formed between the adjacent plies of the fabric which illustrate the seams and other forms of connection between the end portions of the seamless sleeve 46 and the end discs 50, 52 and 61 for purposes of clearly illustrating the disposition of the various members of said seams. It will be understood however that such spacings are an exaggeration for clarity of illustration, whereas in actuality, there are no such spaces and the various plies are in firm abutting relationship with each other in said composite seam.

Referring to FIG. 9, an exemplary illustration is shown to illustrate the actual disposition of the seamed end 78 of the cartridge 44 by which the end disc 52 is connected to the adjacent end of the sleeve 46. It will be seen that rather than said seamed end 78 extending cylindrically as shown in FIG. 4 with respect to the cartridge 44, it actually is turned inwardly and evenly and firmly abuts the periphery of the adjacent screen. This is due to the fact that the inner surface of the housing member 12 merges with the seat 20 in the constricted end 26 thereof in the form of a relatively smooth curve 80, as shown in FIG. 9.

When the member 14 is removed from the member 12, for purposes of inserting a new cartridge 44 within the housing 10, the new cartridge is first introduced into member 14 and the end of the cartridge which projects beyond the outer end of member 14 then is inserted upwardly into the interior of member 12. Member 14 is then threaded into connection with member 12 and incident thereto, the seamed end 78 of the cartridge will be disposed in the configuration shown in FIG. 9 for the following reasons.

The cartridge 46 when completely formed in the manner described above has a length which is slightly greater than the distance between the perforated discs 24 in the opposite ends of the housing 10. Also, the seamless sleeve 46 has a diameter slightly larger than the diameter of the interior cavity 38 within housing 10. Accordingly, when the cartridge is inserted within cavity 38 and the member 14 is tightly connected threadably with member 12, the filter material within the cartridge 44 is placed under limited pressure which is sufficient to expand the flexible side walls of the cartridge comprising sleeve 46 into firm and circumferentially continuous contact with the inner surfaces of the cavity 38 as well as the ends of the cartridge retaining the perforated discs 24 firmly against seats 20 and 22 therefore. Accordingly, such firm engagement of the sides of the cartridge 44 with the walls of the cavity 38 will be maintained at all times during use, whereby no by-passing of gases between the cartridge sleeve 46 and the side walls of the cavity 38 will occur. Accordingly, all fluids, such as gases, and including air, which pass through the filter unit for filtering by the cartridge 44 will be subjected to filtering action. Therefore, maximum filtering efficiency is insured under the circumstances.

From the foregoing, it will be seen that the cartridge may be removed from, and a new cartridge installed within, the housing 10 easily and quickly. Further, the transparent nature of the housing 10 permits visual inspection of the condition of the cartridge at all times, whereby changes in color therein indicate when replacement is necessary.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A filter unit for gaseous material comprising in combination, a housing comprising a pair of cup-shaped housing members and each having cylindrical interior wall surfaces of similar length and uniform diameter, one member having external threads thereon adjacent the open end thereof and the other member having an enlargement at the open end thereof extending outwardly from the interior cylindrical surface thereof and provided with internal threads complementary to the external threads on said one member, whereby the interior wall surfaces of said members when said members are connected defines an elongated cylindrical cavity of uniform diameter extending between the opposite ends of said housing, a gasket positioned between abutting end portions of said members when connected together, the opposite end of each of said members being constricted to form seats and also having an axial opening therethrough of a diameter substantially less than the cylindrical interior wall surfaces, means on said opposite ends of said members operable to be connected to conduit means to feed and discharge gaseous material to and from said housing, perforated discs abutting said seats in said constricted ends, and a cylindrical filter cartridge within said cavity in said members when connected together and having a flexible textile sidewall member slightly larger in diameter than said cavity and also being slightly longer than the distance between said perforated discs, said cartridge being filled with pulverent filter material and the ends of said cartridge being porous and abutting said discs, said discs being sufficiently rigid to at least slightly compress said filter cartridge axially to force said sidewall member into substantially continuous circumferential engagement with the inner cylindrical cavity wall within said housing members when said members are fully connected to prevent by-passing of gaseous material between said cavity wall and said filter cartridge.

2. The filter unit according to claim 1 in which said housing members are molded from transparent synthetic resin of a rigid type when cured to provide a cylindrical cavity of stable dimensions.

3. The filter unit according to claim 1 in which said housing members are molded from a polycarbonate resin to render said filter unit substantially non-reactive to a wide range of gases capable of being filtered by said unit.

4. The filter unit according to claim 1 in which one of said housing members has supporting means integrally formed thereon for attachment to a supporting surface.

5. The filter unit according to claim 1 in which said filter cartridge is provided with a bat of cotton extending across the inlet end of said cartridge.

6. The filter unit according to claim 1 in which said filter cartridge has sidewalls comprising a seamless cylindrical sleeve and end discs formed from porous textile material and filled with pulverent filter material, said end discs being secured respectively to the opposite ends of said sleeve by stitching, one of said ends having a seam formed by said stitching extending into the interior of said cartridge and the other end having a seam formed by said stitching extending outwardly and the outer end of said seam being turned upon itself and additionally stitched to stabilize said other end of said cartridge.

* * * * *